(12) United States Patent
Bradd et al.

(10) Patent No.: US 7,313,145 B1
(45) Date of Patent: Dec. 25, 2007

(54) METHOD AND SYSTEM FOR ESTABLISHING PATHS BETWEEN END POINTS IN PACKET DATA NETWORKS

(75) Inventors: Patrick Bradd, Maidenhead (GB); Robert Turner, Wokingham (GB); Paul Kettlewell, Aylesbury (GB); Leilani Arambepola, London (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 912 days.

(21) Appl. No.: 10/447,908

(22) Filed: May 28, 2003

(51) Int. Cl.
*H04L 12/28* (2006.01)
(52) U.S. Cl. .................................................. 370/401
(58) Field of Classification Search ............ 370/395.54
See application file for complete search history.

(56) References Cited

U.S. PATENT DOCUMENTS

| | | | |
|---|---|---|---|
| 6,360,265 B1 * | 3/2002 | Falck et al. ................. 709/227 |
| 6,687,245 B2 * | 2/2004 | Fangman et al. ........... 370/356 |
| 6,781,982 B1 * | 8/2004 | Borella et al. .............. 370/352 |
| 7,139,828 B2 * | 11/2006 | Alkhatib et al. ............ 709/230 |
| 2003/0154306 A1 * | 8/2003 | Perry ......................... 709/245 |

\* cited by examiner

*Primary Examiner*—Doris H. To
*Assistant Examiner*—Kerri M Rose
(74) *Attorney, Agent, or Firm*—Barnes & Thornburg LLP (57) ABSTRACT

The invention provides a method of determining the degree of network address translation (NAT) traversing required to dynamically establish a bearer path within or out of a Service Provider hosted Enterprise VoIP VPN. Each media end point in the Enterprise IP VPN has associated with it a chain of the identities of a hierarchy of NAT functions behind which it resides with respect to an SP public IP network over which the Enterprise VoIP is hosted. By comparing the respective NAT function identity chains for an originating end point and a destination end point, a call agent can determine what, if any, NAT functions need to be traversed in the bearer path between the end points.

22 Claims, 9 Drawing Sheets

| ENT. A NETWORK | |
|---|---|
| ME IDENTIFIER | NAT - MB IDENTIFIER |
| <$ME_1$, network 110> | MB1 |
| <$ME_2$, network 110> | MB1 |
| . | . |
| . | . |
| . | . |
| <$ME_n$, network 110> | MB1 |
| <$ME_1$, network 112> | MB2 |
| <$ME_2$, network 112> | MB2 |
| . | . |
| . | . |
| . | . |
| <$ME_m$, network 112> | MB2 |

| ME IDENTIFIER | NAT-MB IDENT. CHAIN | TELEPHONY DN |
|---|---|---|
| <ME$_1$, ENT. A, SITE 1> | MB3 | NONE |
| <ME$_2$, ENT. A, SITE 1> | MB3 | <1> |
| . | . | NONE |
| . | . | . |
| . | . | . |
| <ME$_n$, ENT. A, SITE 1> | MB3 | NONE |
| <ME$_1$, ENT. A, SITE 2> | MB3 | NONE |
| <ME$_2$, ENT. A, SITE 2> | MB3 | ←—<1> |
| . | . | <2> |
| . | . | NONE |
| . | . | . |
| <ME$_o$, ENT. A, SITE 2> | MB3 | NONE |
| <ME$_1$, ENT. A, SITE 3> | MB4,MB3 | ←—<1> |
| . | . | <2> |
| . | . | NONE |
| . | . | . |
| . | . | . |
| <ME$_p$, ENT. A, SITE 3> | MB4,MB3 | NONE |
| <ME$_1$, ENT. B> | MB2 | NONE |
| <ME$_2$, ENT. B> | MB2 | ←—<1> |
| . | . | <2> |
| . | . | <3> |
| . | . | NONE |
| . | . | . |
| <ME$_m$, ENT. B> | MB2 | NONE |

METHOD AND SYSTEM FOR ESTABLISHING PATHS BETWEEN END POINTS IN PACKET DATA NETWORKS

TECHNICAL FIELD

The invention generally relates to a method and a system for establishing paths between end points in interconnected packet data networks and in particular, but not exclusively, to a method and a system for dynamically establishing paths between end points in an enterprise internet protocol (IP) virtual private network (VPN) where said enterprise IP VPN is hosted by a service provider (SP).

BACKGROUND OF THE INVENTION

For the purposes of this application the terminology Voice over Internet Protocol (VoIP) or telephony are not limited to voice but could be any media, including for example voice, video, instant messaging, combinations of voice and video etc.

For the purposes of this application, the terminology of Public and Private Network are intended to encompass not only truly public or private networks, but may also include enterprise or any network where the IP address space are either private or not. However, the distinction between Public and Private is obviously relative and Private networks are generally more private than Public networks.

Various forms of communications can be performed in packet based networks, such as electronic mail, web browsing, file transfer and so forth. With the increased capacity and reliability of packet based networks, voice communications (along with other forms of real time, interactive communications) have also become feasible. In such communications, voice and other real time data are carried in packets that are sent across the networks.

Various standards have been proposed for voice and multimedia communications over packet based networks. One such standard is the H.323 Recommendation from the International Telecommunications Union (ITU). Another standard for voice and multimedia communications is the Session Initiation Protocol (SIP), as developed by the Internet Engineering Task Force (IETF). Generally, H.323, SIP, and other control protocols are used for negotiating session information to coordinate the establishment of a communications session. Once negotiation setup has been completed, packetised media (including voice or other forms of real time data) can flow between end points. A media transport protocol, such as the real time protocol (RTP), can be used for conveying packetised media between the end points.

Various issues are associated with communications over packet based networks. One is the dwindling supply of globally unique public addresses, such as IP addresses. To address this problem, network address translation (NAT) is provided to enable address translations between public and private networks. By reusing pools of public IP addresses as private addresses in different private networks, the virtual supply of network addresses is extended.

NAT effectively allows an enterprise to use whatever addresses it chooses for end points in the network of the enterprise provided that packets destined for a public network are mapped to globally unique public addresses and vice versa at the received end. However, enterprises typically follow the IP addressing recommendations provided in the IETF Request for Comments (RFC) 1918.

Figure 1:
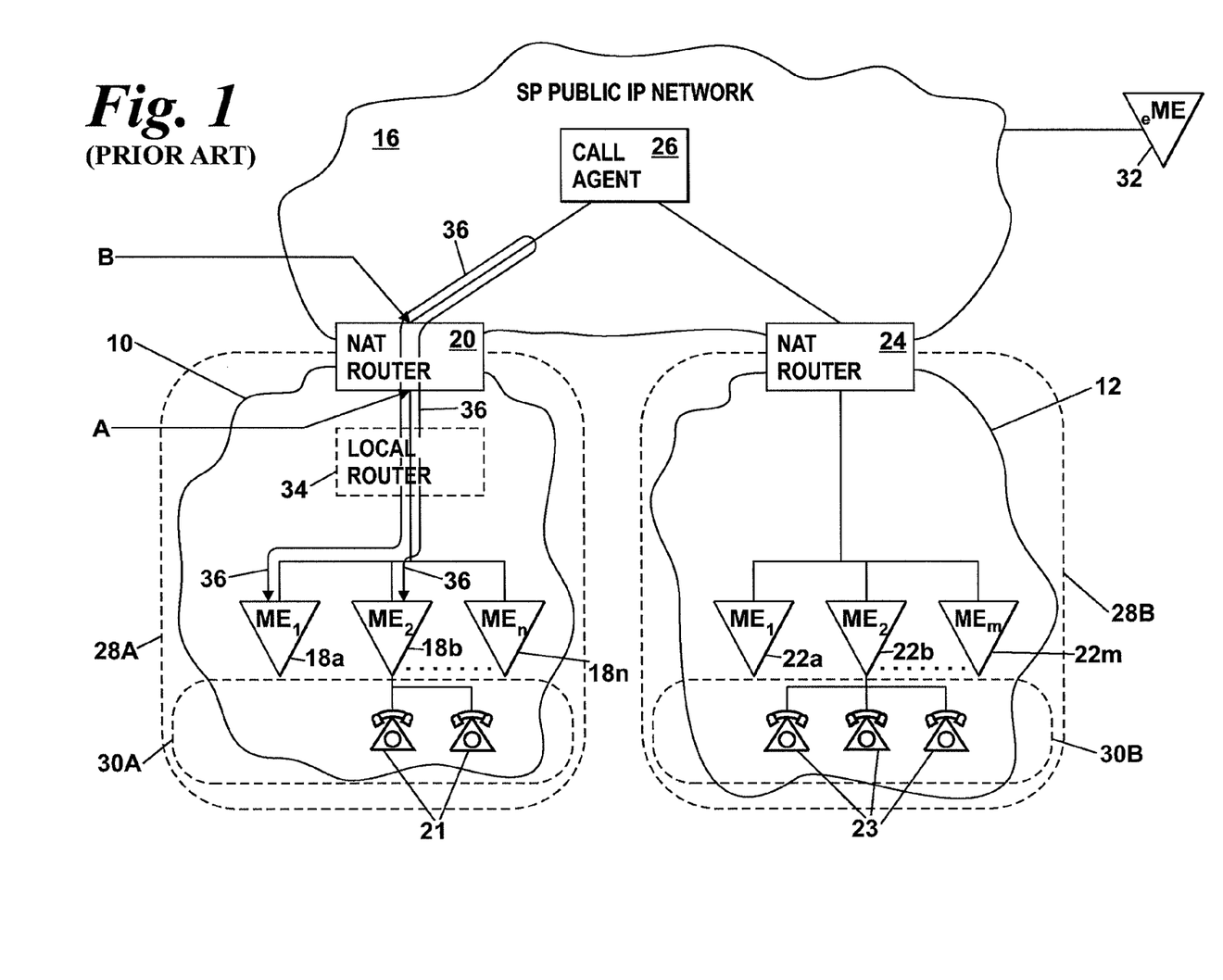
FIG. 1 is a block schematic diagram depicting logically an exemplary, known arrangement of two enterprise private networks interconnected with a public packet data network.

FIG. 1 is a block diagram depicting logically an exemplary, known arrangement of first and second enterprise IP networks 10 and 12. The two enterprise IP networks 10, 12 are connected by a SP public IP network 16. In this context, "public IP network" encompasses IP networks such as the internet which are freely accessible by users, subject to users having appropriate hardware and/or service ware (e.g. an internet service provider (ISP) service), and private IP networks owned by SPs, such networks usually being accessible on a subscription or other financial basis by clients of the SPs. The term "SP" can be considered to include the public carrier network operators and ISPs, or consortiums thereof, who offer shared IP network infrastructures.

First enterprise IP network 10 comprises a network of media endpoints (MEs) 18a, b . . . n, served by a NAT router 20. Similarly, second enterprise IP network 12 comprises a network of MEs 22a, b . . . m served by a NAT router 24. Each of the NAT routers 20, 24 interface with a call agent (CA) 26 of the SP network 16 through appropriate SP network edge devices (not shown). Such edge devices will be familiar to a skilled artisan and so need not be described here.

The CA 26 is a centralised call agent server of the SP network 16 responsible for processing communication session setup requests initiated by the MEs (18, 22) of the first and second enterprise IP networks 10,12 for establishing paths between the MEs (18, 22) and for other MEs external to the enterprise IP networks 10,12. The MEs (18, 22) could comprise user terminals such as personal computer (PC) work stations, network telephones (i.e. telephones having a network interface to enable communication with a packet based network) or other terminals capable of participating in real time interactive communications sessions.

The enterprise IP network 10 may comprise an IP VPN hosted by the SP network 16. This is represented logically by the dashed line 28A in FIG. 1. Whilst the first enterprise IP network 10 is represented by a single cloud 10 in FIG. 1, it will be understood that such a network might comprise a number of geographically separate enterprise locations (sites) served by a single IP VPN hosted by the SP network 16. In such a case, NAT routers serving said geographically separate enterprise locations would logically comprise a single NAT function for the enterprise IP VPN. In the context of this invention, the term "enterprise" can also be construed as encompassing private networks such as a small office home offices (soHos), for example. An IP VPN provides the appearance of a single IP data network over a shared medium which in the arrangement depicted by FIG. 1 is the SP network 16. The IP VPN may have a common, private IP address space across the sites of the enterprise.

In the case where the MEs (18) of the first enterprise IP network 10 have telephony capabilities (represented logically by numeral 21 in FIG. 1) then such MEs would, in respect of their telephony applications, comprise a telephony VPN (represented logically by dashed line 30A in FIG. 1) which would be served by the IP VPN 28A. Together, the telephony VPN 30A and the IP VPN 28A comprise a VoIP VPN for the first enterprise IP network 10.

Similarly to the first enterprise IP network 10, the second enterprise IP network 12 comprises an IP VPN hosted by the SP network 12. This IP VPN is represented logically by the dashed line 28B in FIG. 1. Telephony enabled MEs (represented by numeral 23 in FIG. 1) of the second enterprise IP network 12 comprises a telephony VPN (denoted by dotted line 30B in FIG. 1) and, together with the IP VPN 28B, comprises a VoIP VPN for the second enterprise IP network 12.

Consider the case where a media end point $ME_1$ in the first enterprise IP network 10 initiates a communications session setup request for a communications session with an external media end point eME 32, where eME 32 is connected to the SP network 16 by an appropriate, known edge device (not shown). At a first enterprise IP network 10 private address side of NAT router 20, identified by arrow A in FIG. 1, the source/destination IP address/port pairs associated with the communications session setup request between $ME_1$ and eME 32 will be as shown in the following table:—

TABLE 1

| Source IP address | 10.1.1.1 (private) |
|---|---|
| Source Port | 1000 |
| Destination IP address | 201.3.3.3 (public) |
| Destination Port | 2020 |

In Table 1, the source IP address is the private IP address allocated to $ME_1$ within the first enterprise IP network 10, i.e. this is the address of ME, as it appears behind the NAT router 20. The source port is the port allocated to the communications session setup request from $ME_1$. Allocation of this port may be static in that it is always allocated to communications session setup requests from $ME_1$, but more usually it will be media flow specific. In other words, the port allocated as a result of a communications session setup request from $ME_1$ will normally depend on the media application which forms the basis for the request such that a predetermined NAT private address side port will be allocated to $ME_1$ for say a voice over IP (VoIP) media flow and a different predetermined port allocated to $ME_1$ for, say, a web browser media flow.

The destination IP address and destination port are the public address/port pair for eME 32.

Once a communications session setup request from $ME_1$ has passed through NAT router 20 to a point identified by arrow B in FIG. 1, the source IP address/port pair for $ME_1$ has been translated. This is illustrated in Table 2:—

TABLE 2

| Source IP address | 201.3.3.20 (public) |
|---|---|
| Source Port | 2000 (assigned by NAT 20) |
| Destination IP address | 201.3.3.3 (public) |
| Destination Port | 2020 |

The source IP address for $ME_1$ is now a public, globally unique IP address for the NAT router 20. The NAT router 20 may have a pool of public, globally unique IP addresses from which the source IP address for ME can be selected. The source port is a port on the public IP address side of NAT router 20 associated with $ME_1$. This port may be allocated from a pool of not presently in use ports of the NAT router 20. As such, it is dynamically allocated for the communications session between $ME_1$ and eME 32.

It can therefore be seen that CA 26 cannot associate a specific NAT router private source IP address/port pair to a public source IP address/port pair for a communications session setup request originating from $ME_1$ since there is no fixed relationship created by the network address translation process between said IP address public and private pairs.

The private address side source port may be allocated on a media flow specific basis in addition to a per session basis and thus there could be multiple different ports respectively available for multiple different media flow types. The public address side source port may be dynamically allocated from a pool of not presently in use ports leading to perhaps an even larger pool of ports from which the public address side source port can be selected compared to that for the private address side source port selection. Even if the CA 26 had knowledge of the possible permutations of pairs of private IP source address/port pairs and public IP source address/port pairs, it cannot know which permutation will be utilised in advance of receipt of a communications session setup request.

Where a communications session setup request relates to the establishment of a communications session between a first enterprise ME behind a first NAT having a private IP address with a second enterprise ME behind a second NAT also having a private IP address, that the communications session setup will involve at least two NAT processes such that the first ME will effectively see as its destination the public IP address of the NAT router associated with the second ME and vice versa.

Referring again to FIG. 1, when, say, $ME_1$ of first enterprise IP network 10 makes a communications session setup request to establish a communications session with, say, $ME_2$ of the same network 10, the CA 26 has no means of recognising that $ME_1$ and $ME_2$ reside behind the same NAT router 20. Consequently, the communications session setup request is treated in a similar manner to the foregoing example where $ME_1$ sought a communications session with eME 32. Consequently, the media path for IP packet transmission between $ME_1$ and $ME_2$ of network 10 would follow the media path (represented logically by arrowed line 36 in FIG. 1) from $ME_1$, through network 10 local router (shown as dashed outline) 34, through NAT router 20 to SP network 16 returning along generally the same route to reach $ME_2$. It will be understood that packet flow between $ME_1$ and $ME_2$ will be bidirectional along media path 36.

The media path 36 established between $ME_1$ and $ME_2$ illuminates a number of problems with the network address translation media path provisioning process associated with the known network arrangement of FIG. 1. The bandwidth within the SP network 16 allocated to network 10 will be finite and most likely subject to a service level agreement (SLA) where the SLA will specify financial penalties for the enterprise should it exceed agreed bandwidth levels in the SP network 10. It is therefore in the interest of the enterprise to efficiently use the bandwidth resources of the SP network 16. The media path 36 between $ME_1$ and $ME_2$ is not bandwidth efficient since it utilises bandwidth resources on the SP network 16 when logically it is not necessary to do so. For example, $ME_1$ and $ME_2$ may be physically located close to each other in the same location (site) of network 10 and yet the media path 36 between them passes out of the network 10 into the SP network 16. This also wastes the limited bandwidth available on the physical links connecting the network 10 site to the SP network 16. In this latter example, it would be logically more efficient with respect to usage of SP network 16 bandwidth resources if the media path between $ME_1$ and $ME_2$ did not reach the NAT router 20 but which instead physically remained within the network location (site) extending only as far as the local router 34.

A further problem illuminated by the media path 36 between $ME_1$ and $ME_2$ is the introduction of processing delays that might adversely impact real time, interactive media communications between MEs (18). For real time, interactive media communications such as VoIP, it is important to minimise processing delays encountered by the real time media packets in their media paths. In the case of media path 36, logically unnecessary delays incur in that part of the media path 36 extending between the local router 34 and the SP network 16.

A further problem illuminated by the media path 36 is that the present process of network address translation media path establishment is wasteful of the NAT resources which represent a disproportionally expensive part of the network infrastructure, relatively speaking. It follows therefore that this resource should be utilised only when logically necessary.

In the case where an enterprise employs a common, private IP address space across all its sites within an IP VPN, it follows that NAT routers serving the sites logically comprise a single NAT function behind which all the MEs of the enterprise sit. Each site may have a NAT or some sites may share a NAT. In any event, for a communications session between an ME in one site with an ME of another site, it is also the case that no NAT process is logically required for establishing a media path between these two MEs, but as with the foregoing example, the Call Agent has no means of recognising that the most resource efficient path between these two MEs is a path through the enterprise IP VPN facilitated by respective local routers of the enterprise sites using the private IP addresses of said end points for facilitating packet data transmission between them.

OBJECTS OF THE INVENTION

The present invention seeks to provide an improved path establishment process that obviates and mitigates many of the problems encountered with the aforementioned known path establishment processes.

The present invention also seeks to provide a method of determining the degree of network address translation processing required in dynamically establishing paths between end points in interconnected private and public IP networks.

SUMMARY OF THE INVENTION

According to a first aspect of the present invention, there is provided a method of establishing a path between end points in a communications network, said communications network comprising a private network connected to a packet data network, the method comprising the steps of:—
  a) identifying a first end point and a second end point from a communications session set up request initiated by the first end point, at least one of said end points being located in the private network;
  b) identifying for said first end point a network address translation (NAT) function associated with said first end point;
  c) identifying for said second end point a NAT function associated with said second end point;
  d) comparing the NAT functions identified for said respective end points; and
  e) establishing a packet data transmission path between said end points in dependence on the comparison.

According to a second aspect of the present invention, there is provided a communications system comprising:—
  a packet data network capable of communicating with a plurality of public address pace end points;
    a private network connected to said packet data network, said private network including a number of private address space end points;
    a call agent for processing a communications session setup request initiated by a first end point for establishing a session connection with a second end point, at least one of said end points being located in the private network, wherein said call agent is arranged to:—
      a) identify the first end point and the second end point from the communications session set up request;
      b) identify for said first end point a network address translation (NAT) unction associated with said first end point;
      c) identify for said second end point a NAT function associated with said second end point;
      d) compare the NAT functions identified for said respective end points; and
      e) establish a packet data transmission path between the end points in dependence on the comparison.

According to a third aspect of the present invention, there is provided a call agent for a communications system comprising a private network coupled to a packet data network, the call agent comprising:—
  control logic for processing received communications session setup requests from end points connected to the communications system, some of said end points being located within the private network, said control logic being communicatively coupled to a database storing data identifying said end points and mapping identities of network address translation (NAT) functions associated with said end points, the control logic being arranged to:—
    a) identify a first end point and a second end point from a communications session set up request;
    b) identify for said first end point a network address translation (NAT) function associated with said first end point;
    c) identify for said second end point a NAT function associated with said second end point;
    d) compare the NAT functions identified for said respective end points; and
    e) establish a packet data transmission path between said end points in dependence on the comparison.

According to a fourth aspect of the present invention, there is provided a computer program on a machine readable medium which, when loaded onto a control logic of a communications network call agent for establishing paths between end points in said communication network, said network comprising a private network connected to a packet data network, enables said call agent control logic to carry out the steps of:—
  a) identifying a first end point and a second end point from a communications session set up request initiated by the first end point, at least one of said end points being located in the private network;
  b) identifying for said first end point a network address translation (NAT) function associated with said first end point;
  c) identifying for said second end point a NAT function associated with said second end point;
  d) comparing the NAT functions identified for said respective end points; and
  e) establishing a packet data transmission path between the end points in dependence on the comparison.

According to a fifth aspect of the invention, there is provided a database for a communications system comprising a packet data network capable of communicating with a plurality of public address space end points; a private network connected to said packet data network, said private network including a number of private address space end points; and a call agent for processing a communications session setup request initiated by a first end point for establishing a session connection with a second end point, at least one of said end points being located in the private network, said call agent being arranged to:—
  compare any NAT functions associated with said end points; and establish a packet data transmission path between said end points in dependence on the comparison, wherein said database is arranged to store data identifying endpoints connected to the communications system together with any NAT function identities associated with such end points and to provide NAT function identity data to said call agent in response to call agent requests for such data.

DESCRIPTION OF THE PREFERRED EMBODIMENTS

The foregoing and further features of the present invention will be more readily understood from the following description of preferred embodiments, by way of example only, with reference to the above designated drawings.

Figure 2:
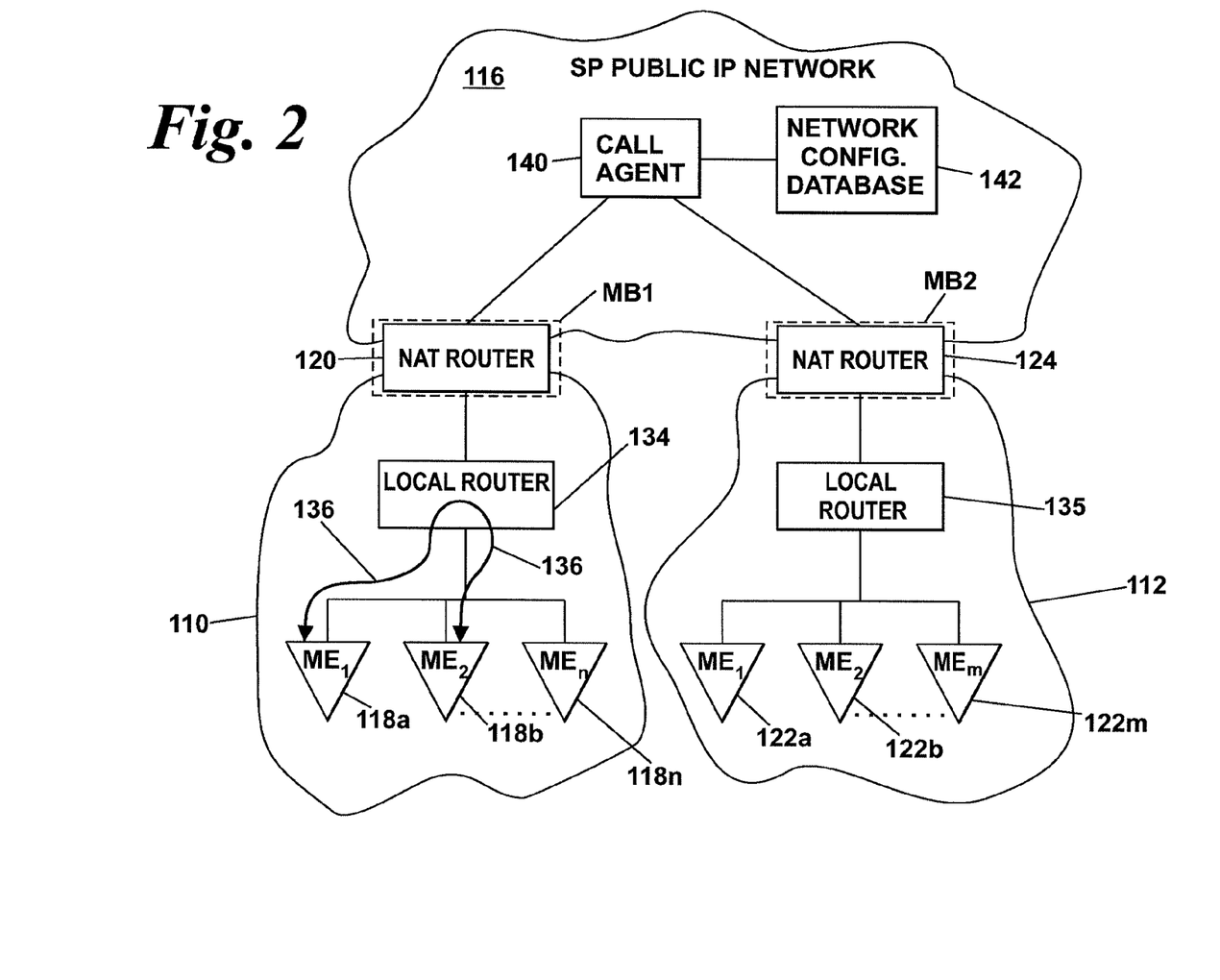
FIG. 2 is a block schematic diagram depicting logically an arrangement of two enterprise private networks interconnected with a public packet data network in accordance with a first embodiment of the invention.

Referring to the drawings, FIG. 2 is a block schematic diagram comprising a logical representation of two networks, generally denoted by the numerals 110 and 112. The arrangement of the networks 110 and 112 is similar to the known arrangement depicted in FIG. 1 so in the following description like parts have been denoted by like numerals prefixed by "1".

As in the arrangement of FIG. 1, the first and second enterprise networks 110, 112 are connected by a service provider (SP) public IP network 116. Each of the networks 110, 112 is respectively served by a NAT router 120, 124 which link said networks 110, 112 to the SP network 116. Each network 110, 112 has a respective network of media end points (MEs) 118, 122 which may comprise a combination of any of personal computer (PC) work stations or the like, telephony enabled PCs and network telephones, referred to as ether sets, by way of example. Each network 110, 112 has a respective local router 134, 135 for facilitating communications session between MEs within that network or with MEs external to that network. Each network 110, 112 employs a separate private IP address space to identify its respective MEs within its network.

The SP network 116 provides a centralised call server function in the form of a call agent (CA) 140 for processing ME communications session setup requests. The CA 140 has associated with it a network configuration database (NCD) 142 and with which it is communicatively coupled for processing communications session setup requests from the MEs 118, 122 or indeed MEs (not shown) external to the first and second enterprise network 110, 112.

The SP public IP network 116 has been represented in FIG. 2 by a single network cloud suggesting that the SP network 116 comprises only a public IP network part. However, it will be appreciated by a skilled artisan that the SP network 116 will have a private network part operated by the SP which may provide MEs access to services such as web browsing, electronic mail etc through SP nodes within said SP private network part in a known manner or a manner as described in applicant's currently pending U.S. patent application Ser. No. 09/881,995, entitled "Network Address and/or Port Translation", the content of which is incorporated herein by way of reference.

The SP private network part may include a media gateway providing access to a public service telephone network (PSTN) and a media portal for facilitating access by MEs to the aforementioned SP private network part nodes and media gateway. It will also be appreciated by a skilled artisan that the CA 140 may be located in the private part of the SP network but such an arrangement is not of significance to the following description of the embodiments of the present invention.

Figure 3:
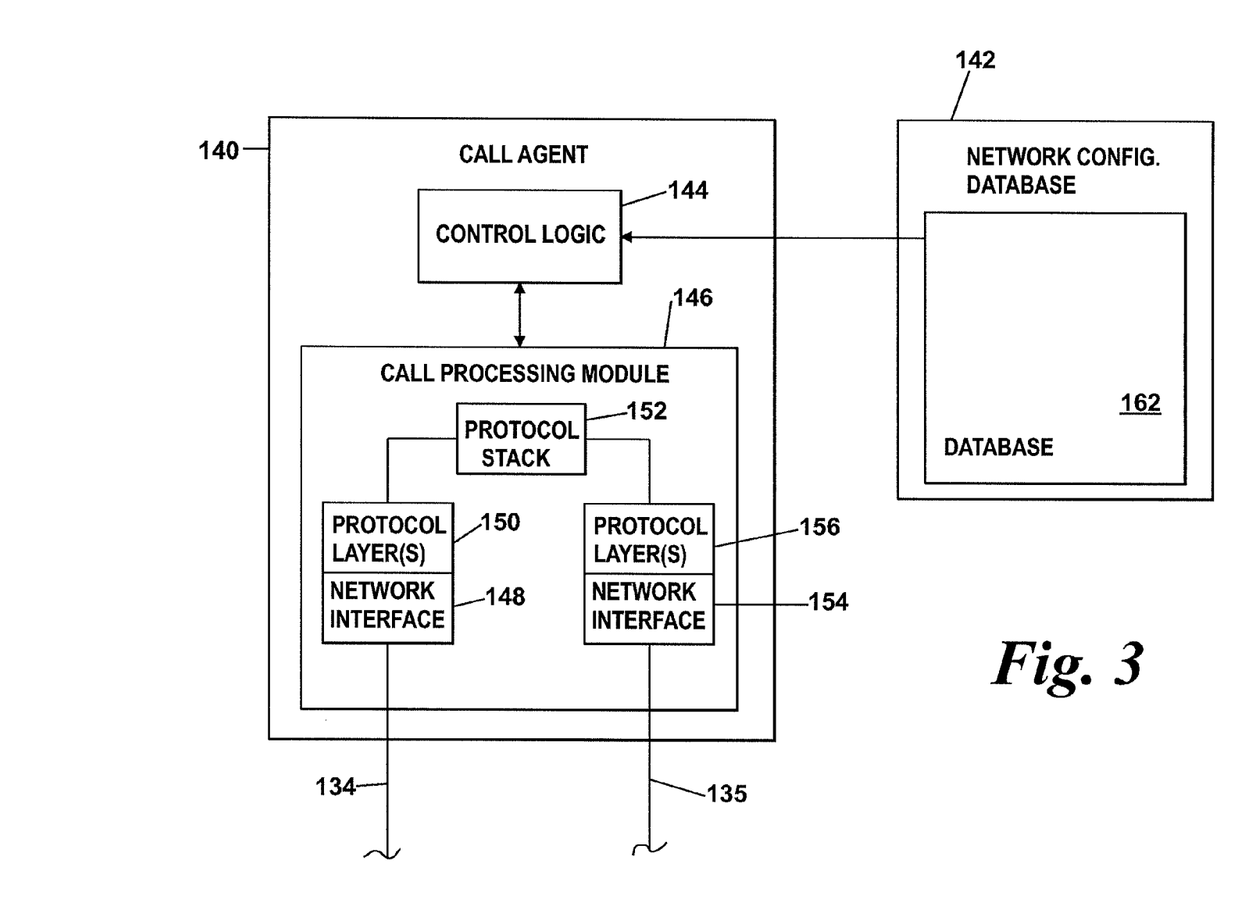
FIG. 3 is a block diagram of components of a call agent and a network configuration database in accordance with the embodiments of the invention.

The structure of the CA 140 and the NCD 142 is illustrated in FIG. 3. The CA 140 includes control logic 144 and a call processing module 146. The call processing module receives call control signalling via the NAT routers 120 and 124. The call processing module includes a network interface 148 to local router 134, one or more protocol layers 150 above the network interface 148 and a protocol stack 152 such as a session initiation protocol (SIP) stack for processing protocol (SIP) messages. Call control signalling for establishing a communications session may use SIP. Alternatively, call control signalling may be in accordance with an enhanced version of the Media Gateway Control Protocol (MGCP), revision 1.0, dated October 1999 or in accordance with the ITU recommendation H.248. SIP is part of the multimedia data and control architecture from the IETF and one version of SIP is described in Request for Comments (RFC) 2543, entitled "SIP: Session Initiation Protocol" dated 1999. Other standards can be employed to provide call signalling such as the H.323 recommendation from the ITU.

The protocol layers may include a User Datagram Protocol (UDP) transport layer and an IP network layer. UDP defines a transport layer that is described in RFC 768, entitled "User Datagram Protocol" dated August 1980. One version of IP is described in RFC 791, entitled "Internet Protocol" dated September 1981 while another version of IP is described in RFC 2460, entitled "Internet Protocol, Version 6 (IPV6) Specification", dated December 1998.

The call processing module 140 also includes a second network interface 154 coupled to the local router 135, and one or more protocol layers 156 above the network interface 154.

The control logic 144 of CA 140 can be implemented in software or a combination of hardware and software.

The NCD 142 includes a database 162. The purpose of the database 162 is to store network configuration data relating to the MEs under control of the CA 140 including the MEs 118, 122 of the first and second enterprise networks 110, 112. The data may be stored in any suitable format familiar to a skilled artisan.

The CA 140 and NCD 142 may be integrated on the same physical platform and communicate via known database retrieval protocols known to the skilled artisan. Alternatively, the CA 140 and the NCD 142 may be located on different physical platforms of the SP network 116 and connected by a CA IP VPN or a public IP network. The CA 140 may not comprise a single device but be distributed as separate CAs throughout the SP network with each CA serving one or more enterprise customers of the SP network. In this latter arrangement, the NCD might exist as a single device comprising data for all MEs of all SP network enterprise customers. Alternatively, the NCD might also be distributed with each NCD storing data for the MEs of the enterprise customers with which that NCD is associated.

The NCD database may be populated by any suitable means including manually uploading the data for each enterprise customer.

In the particular network arrangement of FIG. 2, it is assumed, for the sake of the following description, that the SP network 116 does not provide VPN services to the networks 100, 112 so that an ME in a first site (not shown) of network 110 communicates with an ME in a second site (not shown) of said network 110 using a suitable IP protocol through a path established in SP network 116. In this arrangement, the MEs of the first site of network 110 functionally reside behind a first NAT router whilst the MEs of the second site of network 110 functionally reside behind a second NAT router, irrespective of whether the private IP address spaces of the two sites overlap or not.

Figure 4:
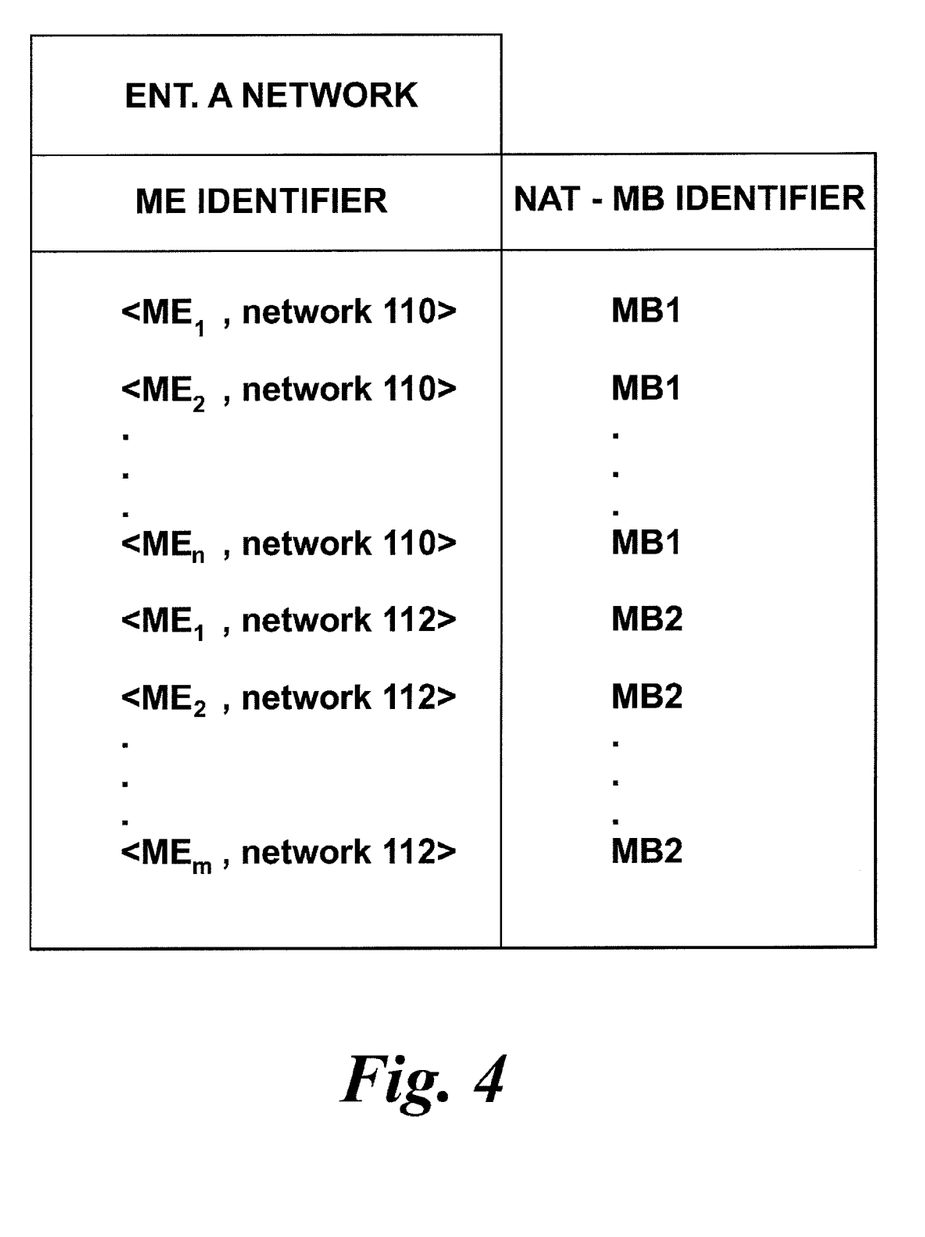
FIG. 4 illustrates the mapping of media end point IP addresses to NAT function identifiers in the network of FIG. 2.

FIG. 4 is a schematic illustration of one possible form of the content of the database 162 for the MEs 118, 122 of the first and second enterprise networks 110, 112 of FIG. 2. For each ME, the database stores the network private IP address for that ME (signified by < > in FIG. 4) or some other unique identifier together with an identifier of a NAT function such as a NAT router behind which that ME functionally resides. Where more than one enterprise is serviced by SP network 116, the database 162 stores similar data for MEs of such enterprises. The database also stores similar data for other MEs connected to the SP network 110. The identifiers allocated to NAT routers are unique within the SP network 116. In the example illustrated by FIG. 4, NAT router 120 has been given identity MB1 and NAT router 124 given identity MB2. It will be appreciated that the identifiers allocated to the NAT functions may not take the form suggested.

When, say, a media end point $ME_1$ of network 110 issues a communications session setup request for a communication session with, say, $ME_2$ of network 112, a call signalling message from $ME_1$ is transmitted to CA 140. The CA 140 identifies from the call signalling the identity of the originating ME, namely $ME_1$ of network 110. It then communicates with NCD 142 to query the identity of the NAT function associated with $ME_1$ of network 110, namely MB1. The CA 140 then derives from the call signalling the identity of the termination ME, namely $ME_2$ of network 112 and queries with the NCD the identity of the NAT function associated with that ME, namely MB2. The CA 140 then compares the NAT function identities, MB1 and MB2 in this example, to determine if they are the same.

In this example, the CA 140 recognises that the NAT function identities, MB1 and MB2, associated respectively with originating $ME_1$ of network 110 and destination $ME_2$ of network 112 are not the same and so instructs media path establishment between $ME_1$ of network 110 and $ME_2$ of network 112 in accordance with known methods. One method for establishing such a media path is described in applicant's currently pending U.S. patent application Ser. No. 09/881,595.

The media path for packet transmission between $ME_1$ of network 110 and $ME_2$ of network 112 extends from $ME_1$ of network 110 through NAT router 120, into SP network 116 to NAT router 124 and then to $ME_2$ of network 112.

In the case where, say $ME_1$ of network 110 initiates a communications session setup request for a communications session with $ME_2$ of the same network, the CA will, from the NAT function identity comparison step, recognise that each of these MEs functionally resides behind the same NAT function, namely NAT router 120 identified as MB1 in database 162. In this case, the CA 140 will instructed $ME_1$ of network 110 to send media packets directly to the network private IP address of $ME_2$ of the same network and instruct $ME_2$ to send media packets directly to the network private IP address of $ME_1$. The media path 10 thus provisioned can be facilitated by local router 134. Consequently, the media path (denoted logically by arrowed line 136 in FIG. 2) so established does not leave the network 110 and so does not utilise the expensive NAT router function for packet transmission.

Figure 5:
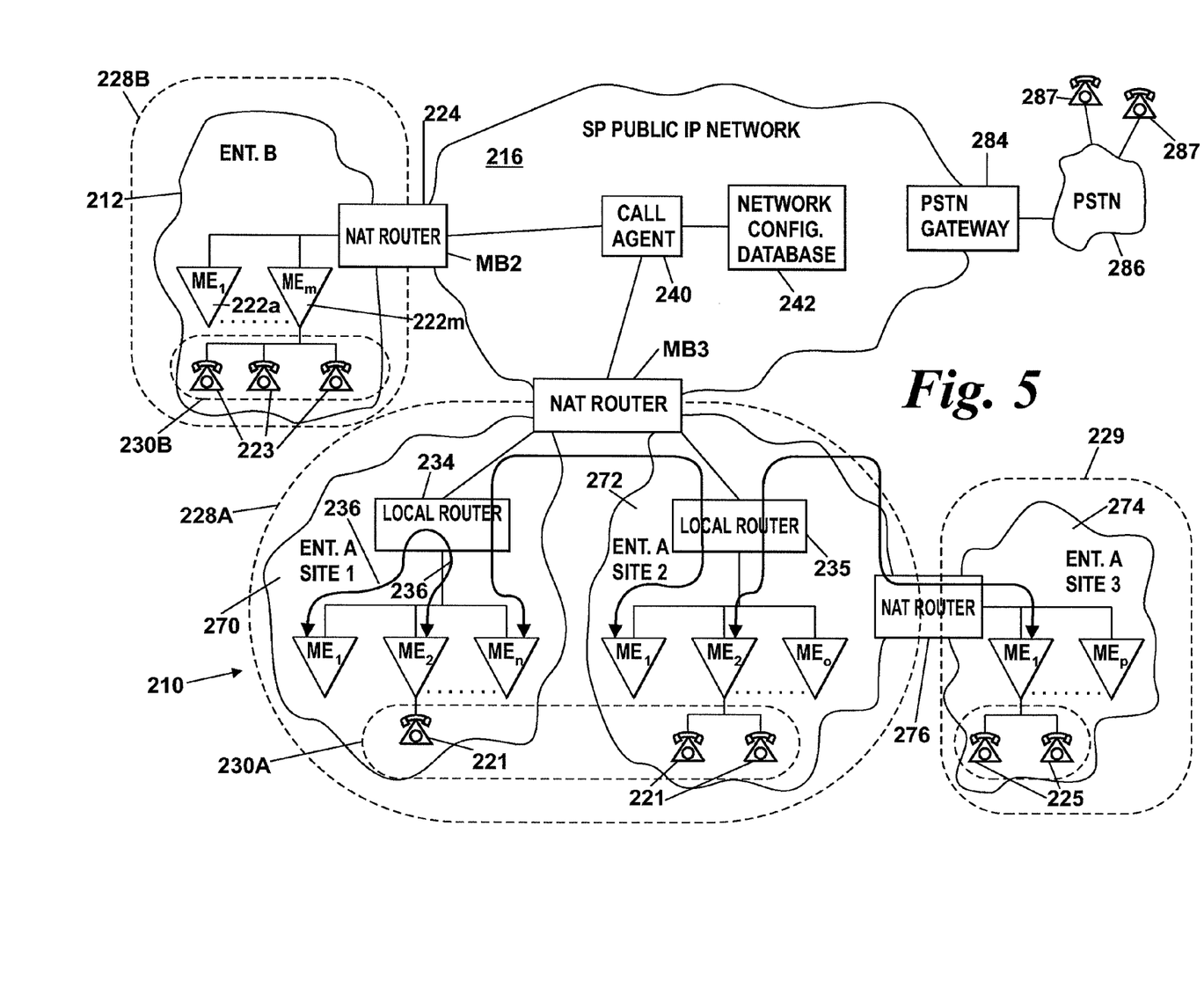
FIG. 5 is a block schematic diagram depicting logically two enterprise private networks interconnected with a public packet data network in accordance with a second embodiment of the invention.

FIG. 5 is a schematic block diagram comprising a logical representation of a network arrangement in accordance with a second embodiment of the present invention. In the description of this embodiment, like numerals will be employed to denote like parts with respect to the first embodiment depicted by FIG. 2, but with the prefix numeral "1" replaced by "2".

In this arrangement, there are shown two enterprise networks generally denoted by the numerals 210 and 212, which will respectively be referred to as "ENT.A" and "ENT.B" for the convenience of the following description. As before, the two enterprise networks 210, 212 are connected by a SP network 216 having a Call Agent (CA) 240 and a network configuration database 242.

ENT.B network 212 is served by a NAT router 224 and has a network of media end points (MEs) 222 which may comprise telephony enabled PCs and network telephones such as ether sets, by way of example. ENT.B network 212 has a common private IP address space for the various sites (not shown) that comprise ENT.B. ENT.B network 212 is served by a single IP VPN (denoted by dotted line 228B in FIG. 5) hosted by SP network 216 which together with a telephony VPN (denoted by dotted line 230B in FIG. 5) comprises a VoIP VPN for ENT.B.

ENT.A network 210 is depicted in FIG. 5 as comprising 3 sites of which site 1 (270) and site 2 (272) are served by a NAT router 220. ENT.A sites 1 and 2 (270, 272) utilise a non-overlapping, common private IP address space. As such, these sites comprise a single IP VPN (denoted by dotted line 228A in FIG. 5). However, in this embodiment, the ENT.A network 210 includes a third site (274) which connects to the rest of the network 210 by a NAT router 276. Each of the ENT.A site (270, 272, 274) respectively serve a number of media endpoints (site 1, $ME_1, \ldots ME_n$; site 2, $ME_1 \ldots ME$; site 3, $ME_1, \ldots ME_3$) which may comprise various devices as described hereinbefore.

It will be seen that the telephony devices (221) of ENT.A sites 1 and 2 (270, 272) form a common telephony VPN (denoted by dotted line 230A in FIG. 5) which together with the IP VPN 228A form a VoIP VPN for these sites. In the case of ENT.A site 3, the telephony devices (denoted by "225") form a separate telephony VPN for this site which is served by an IP VPN (denoted by "229") hosted by SP network 216 for this site.

The SP network 216 also includes a PSTN gateway 284 connecting the SP network 216 to a public switched telephone network 286 which serves PSTN telephony devices 287, for example. The PSTN gateway 284 is instructed by appropriate signalling from the CA 240 to translate between media sent as IP packets to said gateway 284 and the time division multiplex (TDM) circuit switched domain of the PSTN in a known manner.

Figure 6:
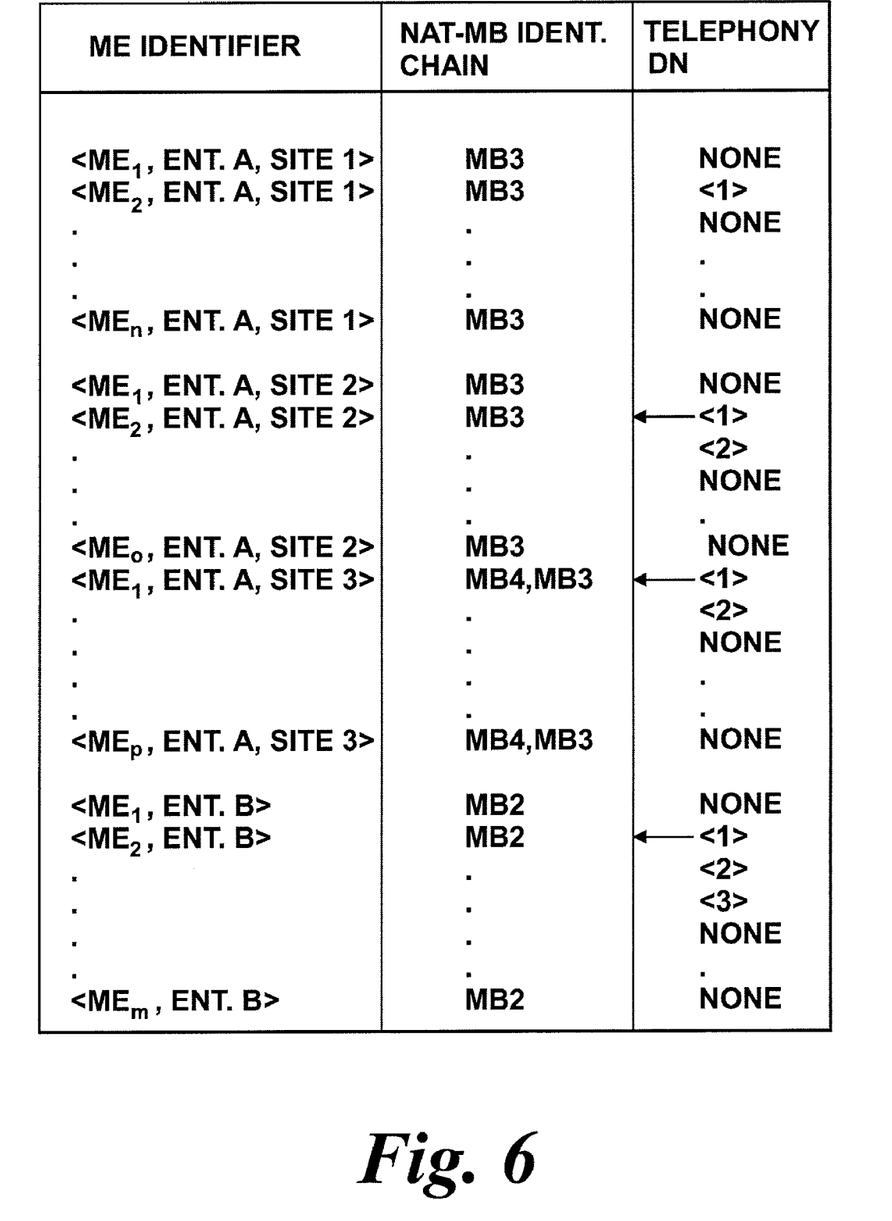
FIG. 6 illustrates the mapping of media end point IP addresses to NAT function identifiers in the network of FIG. 5.

FIG. 6 is a schematic illustration of one form of a possible data content of the database of the NCD 242 for this embodiment of the invention. In this case, the database also stores data for telephony device/capabilities for each ME. The data, denoted by < > in FIG. 6, may comprise a telephony DN as a means of uniquely identifying a telephony device or telephony capability of an ME (e.g. a voice enabled PC). It will be understood that a DN is merely one way of uniquely identifying a telephony device or telephony capability of an ME. Therefore, within the context of this invention references to DNs should be taken to include any known schemes for uniquely identifying telephony devices and the like in IP networks.

As before, for each ME, the database stores data on the NAT function identities (NAT-MBs) associated with said MEs. In contrast to the embodiment of FIG. 2, it can be seen that a single NAT-MB identifier may relate to a number of physically separate enterprise sites whose MEs can be logically grouped behind a single NAT function. In this embodiment, all of the MEs of sites 1 and 2 (270, 272) of the ENT.A network 210 have the same NAT-MB identifier associated with them in the database of the NCD 242.

A further contrast with the embodiment described with respect to FIG. 2 is that, where appropriate, an ME has associated with it in the database of the NCD 242 a NAT-MB chain comprising the identities for all the logical NAT functions that exist between said ME and the SP network 216. In the case of the MEs of site 3 (274) of ENT.A network 210, the NAT-MB chain comprises the identities MB4 for NAT router 276 and the identity MB3 for the NAT router 220. It is preferred that the NAT-MB chain is assembled in the database with the identity of the NAT function closest to the ME being placed first in said chain and with the position of further NAT-MB identifiers in the chain being representative of their functional order between the ME and the SP network 216.

Figure 7:
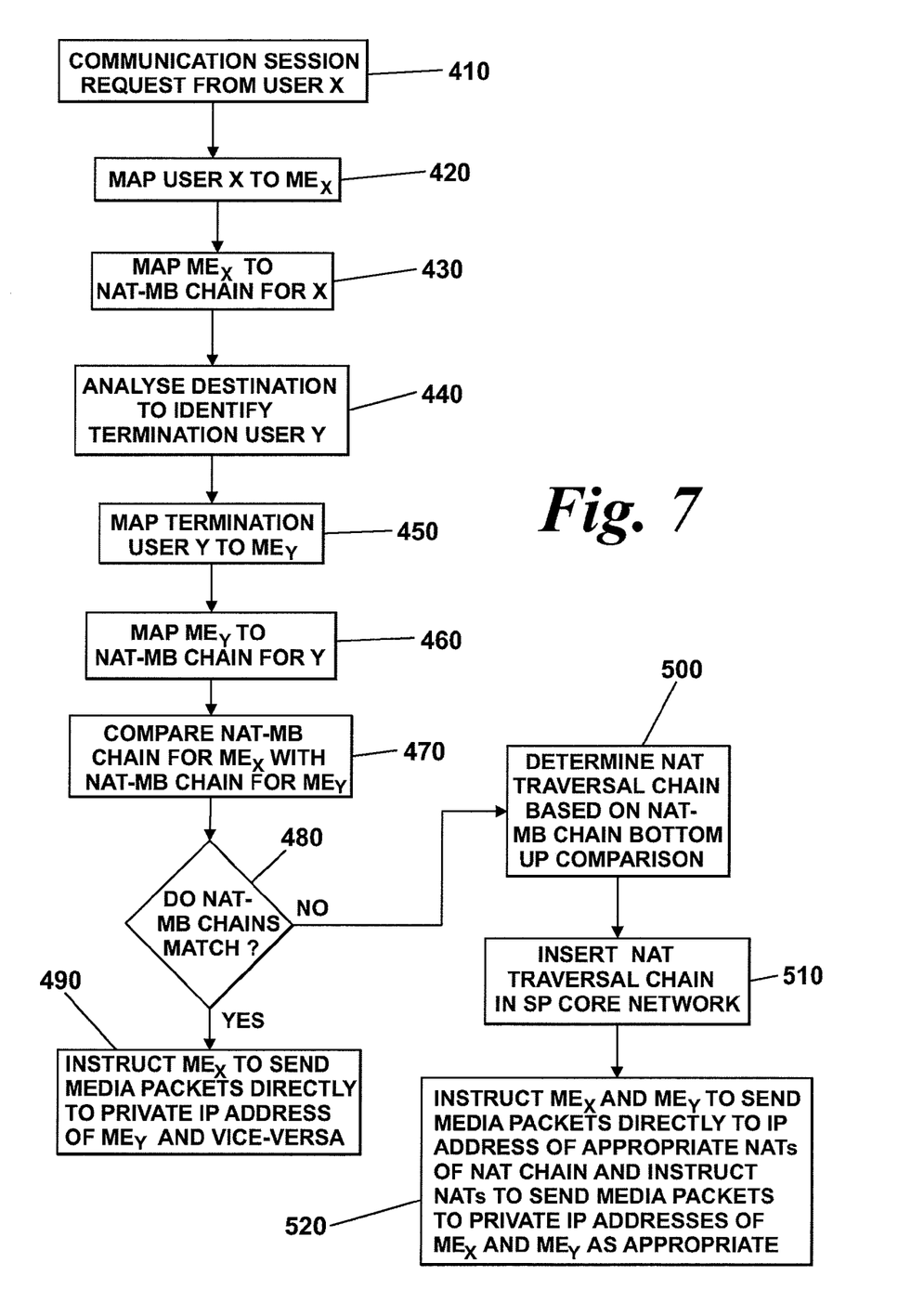
FIG. 7 is a flow chart illustrating the process steps of the path provisioning process employed in the embodiment of the invention depicted by FIG. 5.

FIG. 7 is a flow diagram illustrating the communication sessions call signalling process steps conducted by the CA 240 on receipt of a communications session setup request from an ME. A communications session setup request is received from a user X associated with an $ME_X$ (step 410). The user X may be a telephony device associated with $ME_X$ and its ME ($ME_X$) may be identified by reference to a DN stored in the NCD database (step 420). The CA 340 queries the NCD 242 to retrieve the NAT-MB chain stored in the NCD database for $ME_X$ (step 430). The CA 340 may then analyse the call signalling of the communications session setup request to identify the user Y who user X wishes to set up a call with (step 440). The CA 340 then identifies the ME ($ME_Y$) for user Y, again possibly by reference to a DN for user Y stored in the NCD database (step 450). The CA then retrieves from the NCD database the NAT-MB chain for $ME_Y$ (step 460) and compares the NAT-MB chains for $ME_X$ and $ME_Y$ to determine if they match or not (step 470). It will be appreciated that the above steps may not all necessarily occur in the order suggested or in the serial manner as also suggested by the flow chart diagram of FIG. 7. Some of said steps may occur in parallel, for example.

If at decision point 480, the CA determines that the NAT-MB chains match, then it concludes that $ME_X$ and $ME_Y$ can exchange data packets utilising their private IP addresses and that the NAT functions behind which they reside are not required for the requested communications session (490).

However, where the NAT-MB chains do not match, then the CA 240 compares the chains to determine if there is any overlap between them which would signal that not all the NAT functions identified by the compared NAT-MB chains will be required for the requested communications session (step 500). It is logically simpler that the NAT-MB chains are constructed as aforesaid with the NAT function closest to an ME having its identifier as the first entry in the NAT-MB chain for that ME. The CA moves up the NAT-MB chains of the originating and destination MEs until a common NAT function identifier is found, if at all. This identifier represents a first NAT function that will not be required to establish a communications session between the MEs. Unmatched NAT-MB identifiers remaining in either of the compared chains identify those NAT functions that will be required for establishing the communications session between the MEs. The CA then uses the results of this comparison to establish a bearer path between the end points including the required NAT functions (step 510).

In the latter situation, it will be seen that, whilst NAT resources are necessary to establish the requested communications session between the MEs, the process of the invention has reduced the number of NAT functions that need to be traversed to establish said communications session in contrast with the known path establishment process illustrated by FIG. 1 in which all NAT functions associated with end points $ME_X$ and $ME_Y$ would be included in the bearer path as a matter of course.

Referring again to FIG. 5, it will be seen that by applying the method represented by the flow chart diagram of FIG. 7 confirms the media path 236 for a session connection between $ME$, of site 1 and $ME_2$ of site 1, since both MEs have identical NAT-MB chains, namely MB3. For a communications session connection between, say, $ME_n$ of site 1 and $ME_1$ of site 2, for example, this would not require a NAT function transversal since both MEs have the same NAT-MB chain, namely MB3. This path (depicted by arrowed line 237 in FIG. 5) would logically extend from $ME_n$ of site 1 through local router 234 of site 1 to local router 235 of site 2 to $ME_1$ of site 2. It will be understood that media packets transmitted between these two MEs would utilise the ENT.A network private IP addresses for these MEs and would not be subject to any NAT function processing. The paths represented by arrowed lines 236/7/8 in FIG. 5 represents more SP network resource efficient paths than would be provisioned in the known network arrangement of FIG. 1.

Consider a further session connection between two MEs in the network of FIG. 5 where ENT.A network site 3 resides behind a site specific NAT function (NAT router 276). For a connection between say $ME_2$ of site 2 and $ME_1$ of site 3, a comparison of their respective NAT-MB chains reveals a match at what might be considered the higher order NAT function, namely MB3. The NAT-MB chain of $ME_2$ of site 2 is MB3 whereas the chain for $ME_1$ of site 3 is MB4 followed by MB3. Following the method of the invention, it can be seen that a NAT traversal of NAT function MB4 is required to establish a path between these two MEs but no traversal is necessary of the NAT function MB3. Arrowed line 238 in FIG. 5 represents the logical path for IP packet transmission between these two MEs. Once again, the process of the invention has reduced the number of NAT functions that need to be traversed in contrast with the known path establishment process depicted by FIG. 1.

Figure 8:
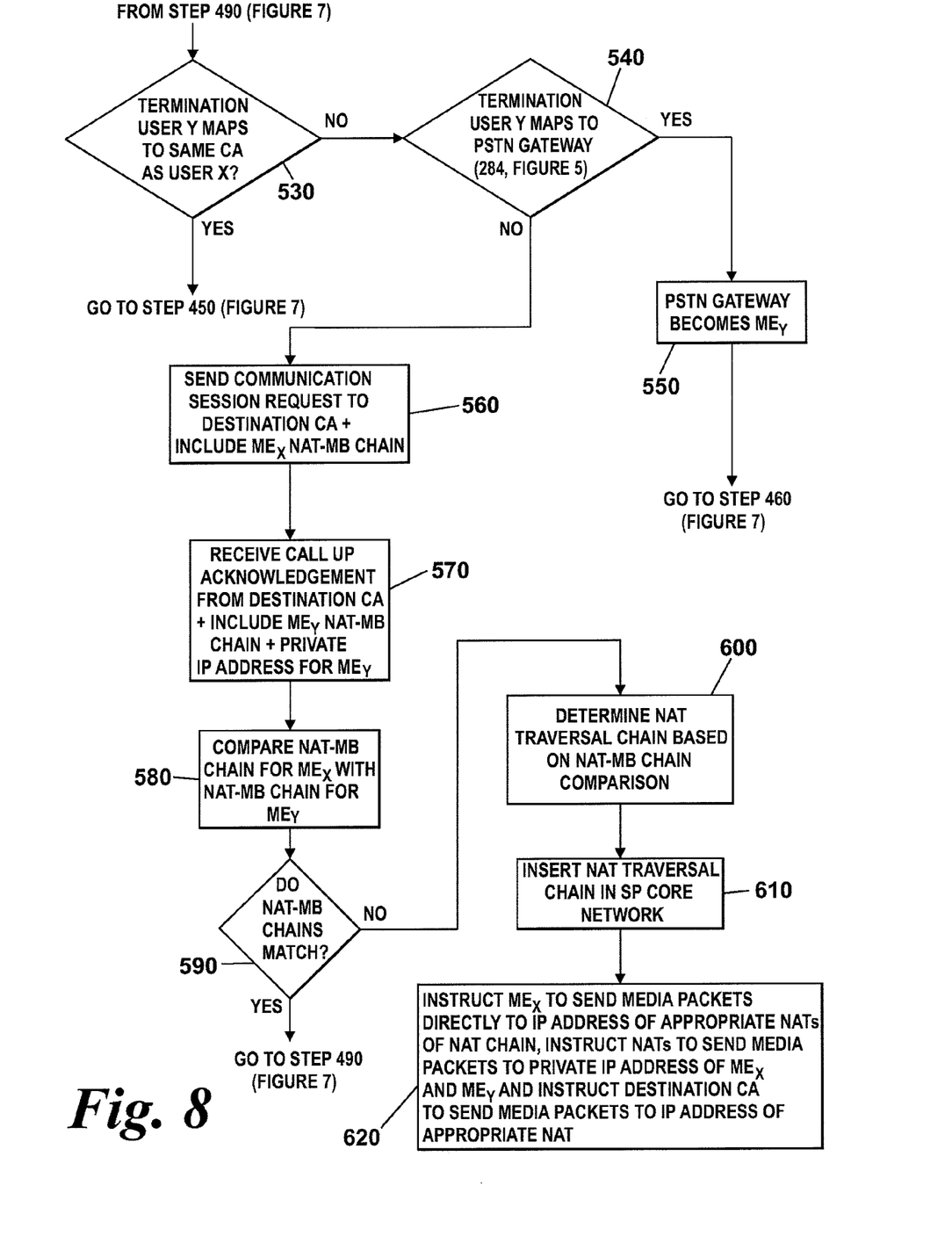
FIG. 8 is an extension of the flow chart of FIG. 7.

FIG. 8 is an extension of the flow chart of FIG. 7 illustrating by decision points 530 and 540 the effect on the process when a termination user designated Y comprises a telephony device 286 connected to SP network 216 by a gateway 284. In this case, the gateway, which may have a globally unique IP address, is treated as though it comprises media end point $ME_Y$ (step 550). The process then continues as at step 460 of FIG. 7. However, if user Y is associated with a different CA than that of user X, then the process follows the steps 560, 570 and 580 of FIG. 8 to reach a decision point of whether the NAT-MB chains for $ME_X$ and $ME_Y$ match (decision point 590) and, if not, to determine to what degree there is any match between these NAT-MB chains (step 600). Further steps 610 and 620 specify the IP packet path provisioning between $ME_X$ and $ME_Y$ when they are served by different CAs.

Figure 9:
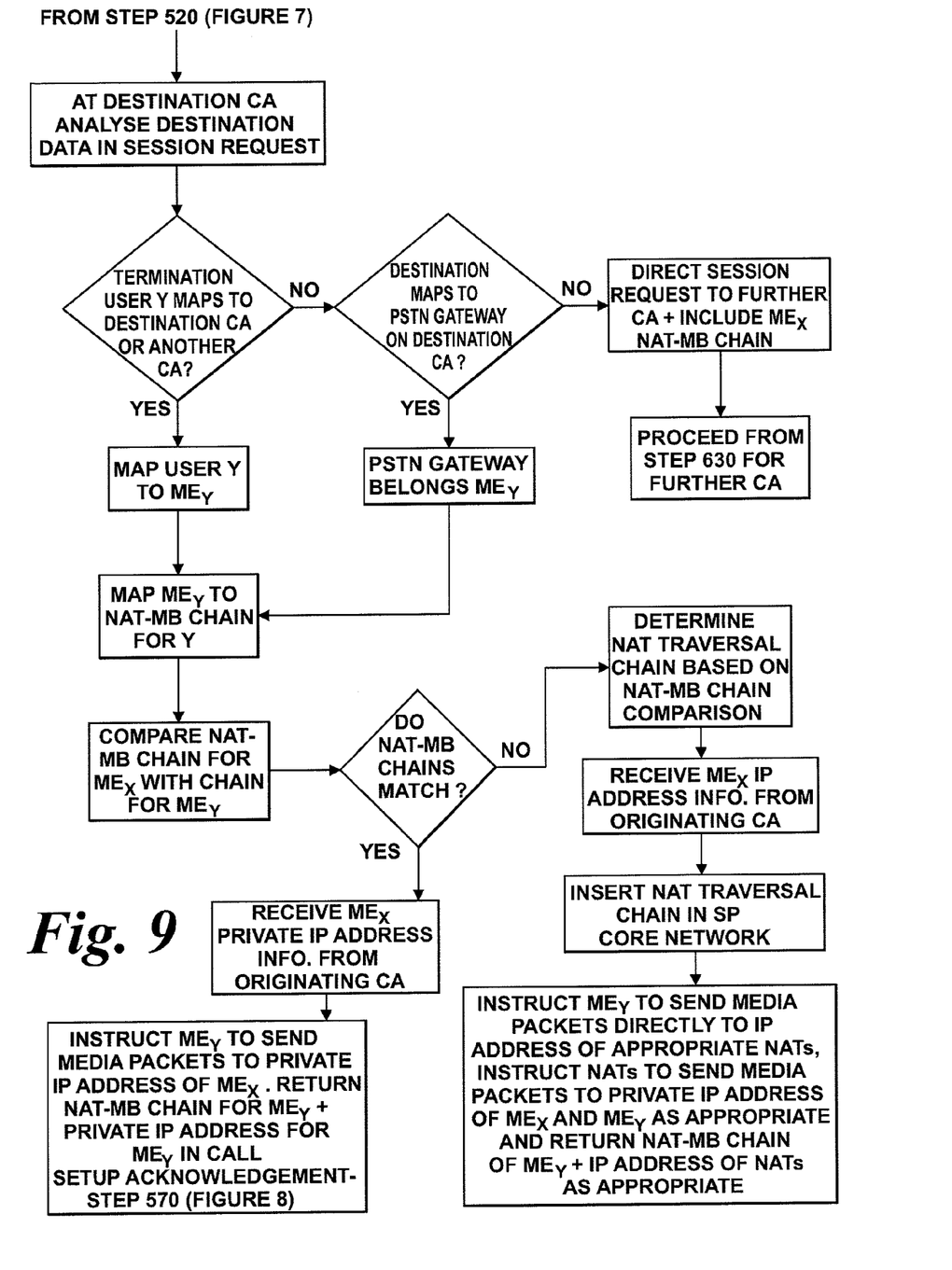
FIG. 9 is an extension of the flow charts of FIGS. 7 and 8.

FIG. 9 is an extension of the flow chart diagram of FIGS. 7 and 8 which sets out the process steps to be taken by a destination CA where it is determined that the media end points $ME_X$ and $ME_Y$ are served by different CAs.

The method of the invention is also applicable to enterprise hosted IP VPNs where network intelligence (call agents) is concentrated in enterprise edge devices which connect the enterprise sites to the SP network. In such an arrangement, the SP network is unaware of the provisioning of paths between end points in the enterprise since it is not involved in the management of the enterprise network. The method of the invention is applied in a similar manner to that for carrier (SP) hosted IP VPNs as depicted by the embodiments of FIGS. 2 and 5 with the exception that the call agent server and network configuration database are located within one of said enterprise sites and where enterprise edge devices of other sites are connected to it via a call agent IP VPN through the SP network. Alternatively, the call agent server and network configuration database may be located at separate enterprise sites wherein said enterprise site edge devices and the call server and network configuration database are connected by an IP-VPN. As a further alternative, each site may contain its own call agent server and/or network configuration database with said devices across the enterprise network being connected via an IP VPN. In any of these arrangements, the method of the invention as depicted by flow chart diagrams FIGS. 7 to 9 can be applied.

The method of the invention can also be applied to a network arrangement in which the public IP network comprises the internet rather than an IP network hosted by the SP. In this case, the service provider (ISP) will include a private network which logically sandwiches the internet between it and the enterprise network. The call agent server and network configuration database will be located in the private network of the ISP. Once again, the call agent server and network configuration database can be arranged as single network devices or as distributed devices as discussed hereinbefore. The ISP network uses a media portal device which is preferably of the type described in applicant's currently pending U.S. patent application Ser. No. 09/881, 595 in order to facilitate the traversal of per session media outside of the enterprise VPN. The media portal is located in the ISP IP address space and physical network. The method of the invention as depicted by flow chart diagrams FIGS. 7 to 9 can equally be applied to this network arrangement.

In summary, the present invention provides a method of determining the degree of network address translation processing required in the provision of IP paths between end points in an enterprise IP network provisioned across a public IP network.

The invention claimed is:

1. A method of establishing a path between end points in a communications network, said communications network comprising a private network connected to a packet data network the method comprising the steps of:
   a) identifying a first end point and a second end point from a communications session set up request initiated by the first end point, at least one of said end points being located in the private network;
   b) identifying for said first end point a network address translation (NAT) function associated with said first end point;
   c) identifying for said second end point a NAT function associated with said second end point;
   d) comparing the NAT functions identified for said first and second end points; and
   e) where the comparison of said NAT functions reveals that said functions include a same NAT function, establishing a packet data transmission path between said end points by instructing said first end point to use a private network address of said second endpoint and instructing said second endpoint to use a private network address of said first endpoint, said private network addresses of said first and second endpoints comprising a private network address space for said private network, said private network address space being different to an address space of the packet data network, whereby said packet data transmission path does not utilise said same NAT function for packet transmission.

2. A method according to claim 1, further comprising the steps of processing the communications session setup request from the first end point by carrying out steps a-e of claim 1 in a call agent.

3. A method according to claim 2, wherein the call agent has a database associated therewith and the method includes the step of storing data identifying the end points connected to the communications network together with the identities of NAT functions associated with each of said end points, the data being stored in a format that maps a NAT function identity to an identity of its respective end point.

4. A method according to claim 3, wherein, where an end point has more than one NAT function associated with it, all of such NAT functions for said end point are stored in the database and the step of comparing NAT functions for the first end point and the second end point includes a comparison of all NAT function identities for said first end point with all NAT function identities for said second end point stored in said database.

5. A method according to claim 4, wherein the NAT function identities for an end point are stored in the database as a chain in an order beginning with the NAT function identity that is logically closest to that end point with respect to the packet data network and wherein the order of subsequent NAT function identities in said chain is indicative of the logical order of said NAT functions between said end point and the packet data network.

6. A method as claimed in claim 5, wherein the step of comparing NAT function identities for the first end point with the NAT function identities for the second end point comprises the steps of:
   comparing a first NAT function identity in a first one of said NAT function identity chains with each of the NAT function identities comprising the other chain until a match, if any, of NAT function identities between the chains is identified;

where no NAT function identity match is identified in the preceding step, repeating that step for each of the remaining NAT function identities in the first one of the NAT function identity chains in the order in which said NAT function identities are located in said chain until a match, if any, of NAT function identities between the chains is identified; and where no match of NAT function identities between the chains is identified, establishing a path between said end points that includes all the NAT functions associated with each of said end points, else, where a NAT function identity match is identified, establishing a path between said end points that does not include the NAT function identified by the matched NAT function identities in the two chains.

7. A method according to claim 6, wherein the step of establishing a path between the end points where a NAT function identity match has been identified, includes excluding any NAT functions identified by NAT function identities in each of the chains which are located subsequent to the matched NAT function identities in said chains.

8. A method according to claim 1, wherein the path for packet data transmission between said end points is established in an internet protocol (IP) virtual private network (VPN).

9. A method according to claim 8, wherein the path established in the IP VPN is established in a service provider hosted enterprise customer IP VPN.

10. A method according to claim 9, wherein the database stores data mapping the dialling numbers (DN) of telephony devices associated with MEs, or representative of telephony capabilities of telephony enabled MEs, with the identities of said MEs in order to facilitate the provision of a telephony VPN over the enterprise customer IP VPN.

11. A communications system comprising:
a packet data network capable of communicating with a plurality of public address space end points;
a private network connected to said packet data network, said private network including a number of private address space end points;
a call agent for processing a communications session setup request initiated by a first end point for establishing a session connection with a second end point, at least one of said end points being located in the private network, wherein said call agent is arranged to:
a) identify a first end point and a second end point from a communications session set up request initiated by the first end point, at least one of said end points being located in the private network;
b) identify for said first end point a network address translation (NAT) function associated with said first end point;
c) identify for said second end point a NAT function associated with said second end point;
d) compare the NAT functions identified for said first and second end points; and
e) where the comparison of said NAT functions reveals that said functions include a same NAT function, establish a packet data transmission path between said end points by instructing said first end point to use a private network address of said second endpoint and instructing said second endpoint to use a private network address of said first endpoint, said private network addresses of said first and second endpoints comprising a private network address space for said private network, said private network address space being different to an address space of the packet data network, whereby said packet data transmission path does not utilise said same NAT function for packet transmission.

12. A communications system according to claim 11, wherein the call agent has a database associated therewith, said database storing data identifying the end points connected to the system together with the identity of NAT functions associated with each of the end points.

13. A communications system according to claim 11, wherein, where an end point has more than one NAT function identity associated with it, all of such NAT function identities are stored in the database as a chain of NAT function identities.

14. A communications system according to claim 13, wherein the call agent has a control logic for comparing the NAT function identity chains of respective endpoints to identify a match, if any, between any of the NAT function identities of said NAT function identity chains; and
a call processing module to establish a path between said end points responsive to the results of the comparison of said NAT function identity chains.

15. A communications system according to claim 11, wherein there is provided a plurality of call agents in the packet data network serving a plurality of SP enterprise customers.

16. A communications system according to claim 15, wherein there is a single call agent database associated with said plurality of call agents, said database containing data for all end points of the SP enterprise customers together with NAT function identities mapped to said end points, the call agents and database being communicatively coupled by a call agent IP VPN provisioned by the SP on the packet data network.

17. A communications system according to claim 11, wherein there is provided a call agent and a database for each SP enterprise customer or each group of SP enterprise customers and wherein each call agent has a database associated therewith which stores data for each of the end points of the enterprise customers served by the call agent associated with said database.

18. A communications system according to claim 11, wherein the private network is a SP hosted enterprise IP VPN over the packet data network, and the packet data network is a public IP network.

19. A communications system according to claim 18, wherein the database also stores the DNs of telephony devices associated with the end points mapped to the stored data identifying the end points, the stored DNs facilitating the provision by the call agent of a telephony VPN over the enterprise IP VPN.

20. A call agent for a communications system comprising a private network coupled to a packet data network, the call agent comprising:
control logic for processing received communications session setup requests from end points connected to the communications system, some of said end points being located within the private network, said control logic being communicatively coupled to a database storing data identifying said end points and mapping identities of network address translation (NAT) functions associated with said end points, the control logic being arranged to:
a) identify a first end point and a second end point from a communications session set up request initiated by the first end point, at least one of said end points being located in the private network;

b) identify for said first end point a network address translation (NAT) function associated with said first end point;

c) identify for said second end point a NAT function associated with said second end point;

d) compare the NAT functions identified for said first and second end points; and e) where the comparison of said NAT functions reveals that said functions are a same NAT function, establish a packet data transmission path between said end points by instructing said first end point to use a private network address of said second endpoint and instructing said second endpoint to use a private network address of said first endpoint, said private network addresses of said first and second endpoints comprising a private network address space for said private network, said private network address space being different to an address space of the packet data network, whereby said packet data transmission path does not utilise said same NAT function for packet transmission.

21. A call agent according to claim 20, wherein, where an end point has more than one NAT function identity associated with it, all of such NAT function identities are stored in the database as a chain of NAT function identities.

22. A call agent according to claim 21, wherein the control logic is arranged to compare the NAT function identity chains of respected endpoints to identify a match, if any, between any of the NAT function identities of said NAT function identity chains; and a call processing module to establish a path between said end points responsive to the results of the comparison of said NAT function identity chains.

* * * * *